United States Patent [19]
Kadowaki et al.

[11] Patent Number: 6,025,893
[45] Date of Patent: Feb. 15, 2000

[54] LIQUID CRYSTAL DISPLAY DEVICE OF REFLECTION TYPE

[75] Inventors: Takeshi Kadowaki; Mitsuru Koarai, both of Kofu, Japan

[73] Assignees: Pioneer Electronic Corporation, Tokyo-to, Japan; Pioneer Video Corporation, Yamanashi-ken, Japan

[21] Appl. No.: 08/887,898

[22] Filed: Jul. 3, 1997

[30] Foreign Application Priority Data

Jul. 4, 1996 [JP] Japan ............................... PO8-193887

[51] Int. Cl.⁷ ........................ G02F 1/1333; G02F 1/1345
[52] U.S. Cl. ........................... 349/58; 349/150; 349/149; 349/152
[58] Field of Search ............................ 349/58, 149, 150, 349/151, 152, 158, 60

[56] References Cited

U.S. PATENT DOCUMENTS

| | | | |
|---|---|---|---|
| 3,973,388 | 8/1976 | Yoshida et al. | 349/58 |
| 4,058,970 | 11/1977 | Ichinose | 349/152 |
| 4,145,120 | 3/1979 | Kubota | 349/152 |
| 5,767,827 | 6/1998 | Kobayashi et al. | 349/87 |
| 5,818,564 | 10/1998 | Gray et al. | 349/58 |
| 5,841,501 | 11/1998 | Eiraku et al. | 349/150 |
| 5,880,795 | 3/1999 | Nagata et al. | 349/150 |

*Primary Examiner*—William L. Sikes
*Assistant Examiner*—Dung Nguyen
*Attorney, Agent, or Firm*—Sughrue, Mion, Zinn, MacPeak & Seas, PLLC

[57] ABSTRACT

A liquid crystal display device of reflection type has a liquid crystal display panel and a fixture substrate for fixing the liquid crystal display panel. The liquid crystal display panel is provided with: a semiconductor substrate; a transparent substrate opposed to the semiconductor substrate and on which a transparent electrode is formed, the transparent substrate having a width in a first direction along a surface thereof wider than the semiconductor substrate; a liquid crystal layer sealed between the semiconductor substrate and the transparent substrate; a plurality of switching elements formed on the semiconductor substrate in a matrix manner in correspondence with a pixel arrangement; and a plurality of pixel electrodes formed in the matrix manner in correspondence with the pixel arrangement each connected to respective one of the switching elements. The fixture substrate is provided with an aperture portion to which an aperture, which area is larger than an outline of the semiconductor substrate and which width in the first direction is narrower than the transparent substrate, is formed. The semiconductor substrate is disposed within the aperture. And that, both of edge portions in the first direction of the transparent substrate are adhered on the fixture substrate at a peripheral of the aperture by an adhesive agent.

10 Claims, 3 Drawing Sheets

LIQUID CRYSTAL DISPLAY DEVICE OF REFLECTION TYPE

BACKGROUND OF THE INVENTION

1. Field of the Invention

The present invention relates to an LCD (Liquid Crystal Display) device of reflection type.

2. Description of the Related Art

There is an LCD device of reflection type, which is provided with an LCD panel fixed on a fixture substrate. The LCD panel is produced by filling and sealing liquid crystal between a silicon substrate and a glass substrate opposed to each other. On the silicon substrate, there are formed: a plurality of MOS (Metal Oxide Semiconductor) FETs (Field Effect Transistors) as switching elements arranged in a matrix manner each of which includes a source, a gate and a drain; an insulation layer for covering each of the MOS FETs; and a plurality of pixel electrodes, which are arranged in the matrix manner on the insulation layer through a gap to each other, are formed of aluminum and has a role of a reflection layer. On the other hand, on the glass substrate, there is formed a transparent electrode all over the surface of the glass substrate.

In the above explained LCD device, at a time of fixing the LCD panel to the fixture substrate, the silicon substrate and the fixture substrate are fixed to each other by an adhesive agent. In this case, stresses such as a shrinkage stress or the like are directly applied to the silicon substrate when the adhesive agent is hardened. In case the adhesive agent is the heat hardening type, the stress such as a heat stress or the like is also applied to the silicon substrate. Since the stress is applied to each pixel electrode formed on the silicon substrate, concave and convex irregularities are generated with respect to the liquid crystal layer. Due to the irregularities, irregularities and variations are generated in the thickness of the liquid crystal layer, resulting in the uniformity in the brightness of the image display, which is based on the display data for each pixel, being degraded.

SUMMARY OF THE INVENTION

It is therefore an object of the present invention to provide an LCD device of reflection type, which can be easily manufactured and which can improve the uniformity in the brightness of the image display.

The above object of the present invention can be achieved by a liquid crystal display device of reflection type having a liquid crystal display panel of reflection type and a fixture substrate for fixing the liquid crystal display panel thereto. The liquid crystal display panel is provided with: a semiconductor substrate; a transparent substrate opposed to the semiconductor substrate and on which a transparent electrode is formed at a side opposing to the semiconductor substrate, the transparent substrate having a width in a first direction along a surface thereof wider than the semiconductor substrate; a liquid crystal layer sealed between the semiconductor substrate and the transparent substrate; a plurality of switching elements formed on the semiconductor substrate at a side opposing to the transparent substrate in a matrix manner in correspondence with a pixel arrangement; and a plurality of pixel electrodes formed in the matrix manner in correspondence with the pixel arrangement each connected to respective one of the switching elements. The fixture substrate is provided with an aperture portion to which an aperture, which area is larger than an outline of the semiconductor substrate and which width in the first direction is narrower than the transparent substrate, is formed. The semiconductor substrate is disposed within the aperture. And that, both of edge portions in the first direction of the transparent substrate are adhered on the fixture substrate at a peripheral of the aperture by an-adhesive agent.

According to the present invention, at the time of fixing the liquid crystal display panel, in which the liquid crystal layer is sealed between the semiconductor substrate and the transparent substrate, to the fixture substrate, the semiconductor substrate is disposed within the aperture of the fixture substrate. And that, both of the edge portions in the first direction of the transparent substrate and the fixture substrate are adhered to each other by the adhesive agent. Thus, the stresses such as the heat stress, the shrinkage stress and the like at the time of hardening the adhesive agent, are not applied to the central portion of the transparent substrate sealing the liquid crystal layer or to the semiconductor substrate. Consequently, the thickness of the liquid crystal layer can be maintained uniform, so that the image display having the uniform brightness can be obtained according to the present invention.

In one aspect of the present invention, a first terminal is formed on the fixture substrate at the peripheral, at least in the first direction, of the aperture. The adhesive agent has an electrically conductive property. And that, the transparent electrode is electrically connected at the edge portions in the first direction of the transparent substrate with the first terminal by the adhesive agent.

According to this aspect, at the time of fixing the liquid crystal display panel to the fixture substrate, the first terminal formed at the peripheral of the fixture substrate and the transparent electrode formed on the transparent substrate are electrically connected with each other by use of the adhesive agent having the electrically conductive property. Thus, after fixing the liquid crystal display panel to the fixture substrate, it is not necessary anymore to apply a process of connecting the first terminal and the transparent electrode with each other, so that the liquid crystal display device of reflection type can be rather easily manufactured.

In the above described one aspect, the adhesive agent may comprise an adhesive agent of ultra-violet light hardening type having the electrically conductive property.

Thus, it is possible to easily fix the liquid crystal display panel to the fixture substrate by irradiating the ultra-violet light to the adhesive agent, so that the liquid crystal display device of reflection type can be more easily manufactured.

In the above described one aspect, a plurality of second terminals, which are respectively connected to the switching elements, may be formed on the semiconductor substrate at an edge portion thereof in a second direction, which is perpendicular to the first direction. A plurality of third terminals may be formed on the fixture substrate such that the third terminals are respectively opposed to the second terminals. A surface of the edge portion of the semiconductor substrate, where the second terminals are formed, and a surface of the fixture substrate, where the third terminals are formed, may be disposed at a substantially same level, with respect to a direction perpendicular to the surface of the fixture substrate, to each other. And that, the second terminals and the third terminals may be respectively connected by conductors.

Thus, after fixing the liquid crystal display panel to the fixture substrate by the adhesive agent, each of the second terminals formed on the semiconductor substrate are disposed substantially at the same level as respective one of the third terminals formed on the fixture substrate. Therefore, it is possible to easily connect the second terminals with the third terminals by the conductors respectively, so that the liquid crystal display device can be more easily manufactured.

In this case, each of the conductors may be a bonding wire bonded to respective one of the second terminals at one end thereof and to respective one of the third terminals at the other end thereof. Thus, it is possible to easily connect the second terminals with the third terminals by the bonding wires respectively by means of a known wire bonding method.

Alternatively in this case, each of the conductors may be a beam lead formed on respective one of the second terminals and bonded to respective one of the third terminals at a lead portion thereof. Thus, it is possible to easily connect the second terminals with the third terminals by the beam leads respectively by means of a known beam lead method.

In the above described one aspect of the present invention, the first terminal may be shaped in a U character on the fixture substrate positioned around the aperture. And that, both of end portions of the first terminal may be connected to the transparent electrode by the adhesive agent.

Thus, the first terminal shaped in the U character formed around the aperture can be easily connected to the transparent electrode by the adhesive agent while allowing the semiconductor substrate to be disposed within the aperture without any problem.

In another aspect of the present invention, the switching elements respectively have MOS FETs formed on the semiconductor substrate, which are insulated from each other by an insulation layer formed on the semiconductor substrate. And that, the pixel electrodes are electrically insulated from each other by a gap filled with the insulation layer.

According to this aspect, the pixel electrodes of the liquid crystal display panel, which are electrically insulated from each other by a gap filled with the insulation layer, can be promptly driven by the MOS FETs respectively. Thus, the image display having the uniform brightness and the high visibility can be obtained according to the present invention.

In another aspect of the present invention, the liquid crystal display device is further provided with a dielectric layer formed on the semiconductor substrate at the side opposing to the transparent substrate for reflecting an incident light from the transparent substrate through the liquid crystal layer.

According to this aspect, the liquid crystal display device of reflection type can be realized by virtue of the dielectric layer as the reflection layer for reflecting the incident light through the liquid crystal layer.

In another aspect of the present invention, each of the pixel electrodes comprises aluminum having a role of a reflection layer for reflecting an incident light from the transparent substrate through the liquid crystal layer.

According to this aspect, the liquid crystal display device of reflection type can be realized by virtue of the pixel electrodes of aluminum as the reflection layer for reflecting the incident light through the liquid crystal layer.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Figure 1A:
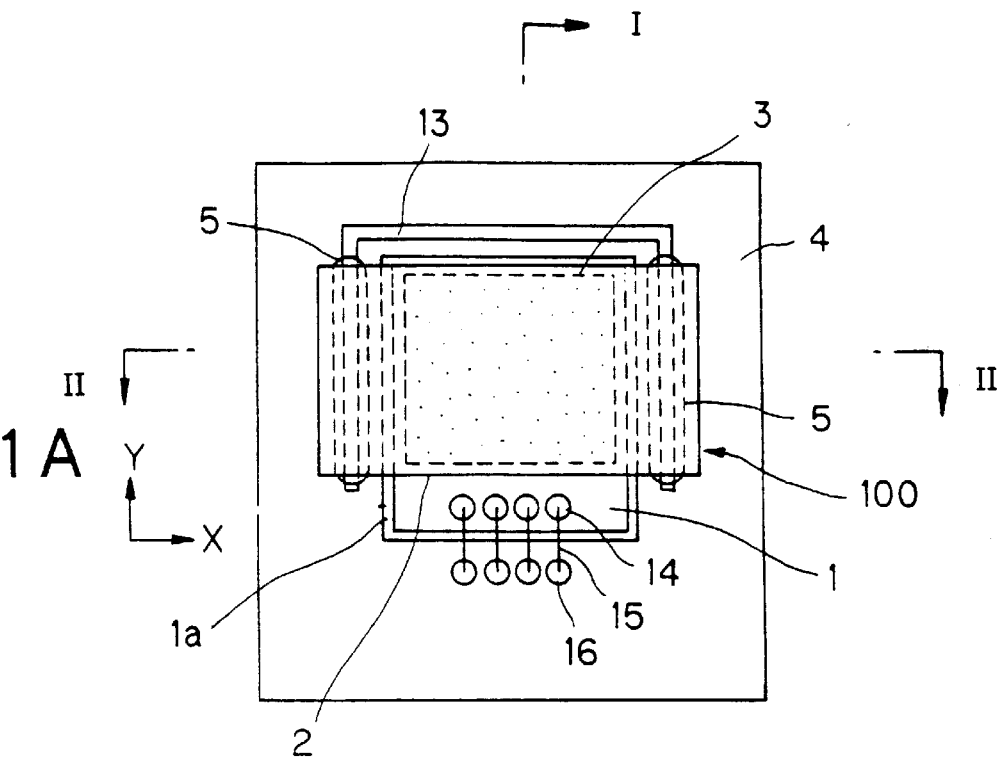
FIG. 1A is a plan view of an LCD device of reflection type as one embodiment of the present invention.
Figure 1B:
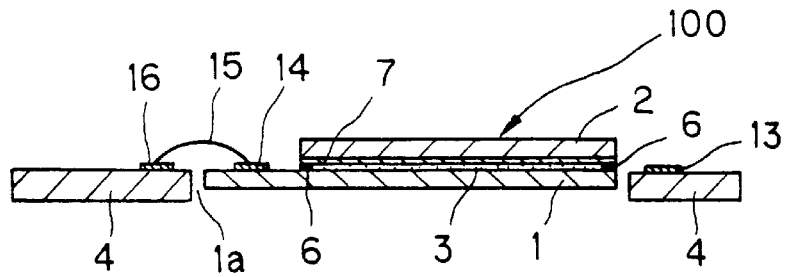
FIG. 1B is an I—I sectional view of the LCD device of FIG. 1A.
Figure 1C:
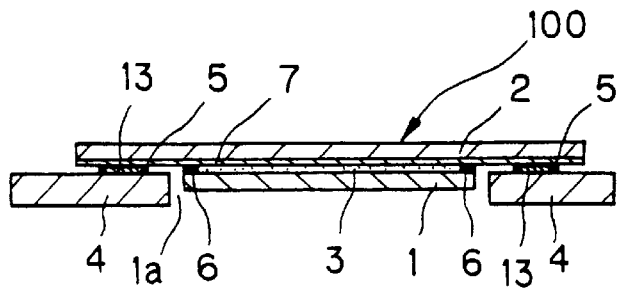
FIG. 1C is a II—II sectional view of the LCD device of FIG. 1A.

Referring to the accompanying drawings, embodiments of the present invention will be now explained with reference to FIGS. 1A to 4. FIG. 1A is a plan view of an LCD device as an embodiment of the present invention, showing a major structure of the LCD device from an upper direction thereof. FIG. 1B is a sectional view along a Y axis among X and Y axes perpendicular to each other shown in FIG. 1A i.e. an I—I sectional view of the LCD device of FIG. 1A. FIG. 1C is a sectional view along the X axis among the X and Y axes i.e. a II—II sectional view of the LCD device of FIG. 1A;

As shown in FIGS. 1A to 1C, the LCD device as the embodiment has a LCD panel 100, which is provided with: a silicon substrate 1 of P type as one example of a semiconductor substrate; a glass substrate 2 opposed to the silicon substrate 1 through a gap such that a spacer etc. is partially interposed therebetween; and a liquid crystal 3 filled in the gap, which is sealed by a sealing member 6 between these substrates 1 and 2 at the peripheral portions thereof, by means of a vacuum evacuation or the like. The LCD panel 100 is mounted or fixed to a fixture substrate 4, which is a glass epoxy substrate for example, such that the glass substrate 2 is adhered to the fixture substrate 4 by an adhesive agent 5 of ultra-violet light hardening type.

On the glass substrate 2 at the side facing to the liquid crystal 3, there are sequentially laminated a plurality of layers including: a transparent electrode 7 such as an ITO (Indium Tin Oxide) electrode etc., which electric potential is held at a common voltage or which is grounded; and an alignment film not shown in the figure, which is formed of silicon oxide etc. obliquely vapor-deposited on the transparent electrode 7 for example. The black matrix is not included in these laminated layers in the present embodiment. However, the black matrix may be also formed on the glass substrate 2 so as to improve the contrast, prevent the colors from being mixed and so on. The alignment film is formed in a porous manner. The liquid crystal 3 is nematic liquid crystal of perpendicular orientation type.

The adhesive agent 5 of ultra-violet light hardening type has an electrically conductive property. When the adhesive agent 5 is used for adhering the TCD panel 100 to the fixture substrate 4, the adhesive agent 5 electrically connects a terminal 13, which is formed on the fixture substrate 4, and the transparent electrode 7, which is formed on the glass substrate 2 while physically adhering or fixing the terminal 13 and the transparent electrode 7 in one body.

Figure 2:
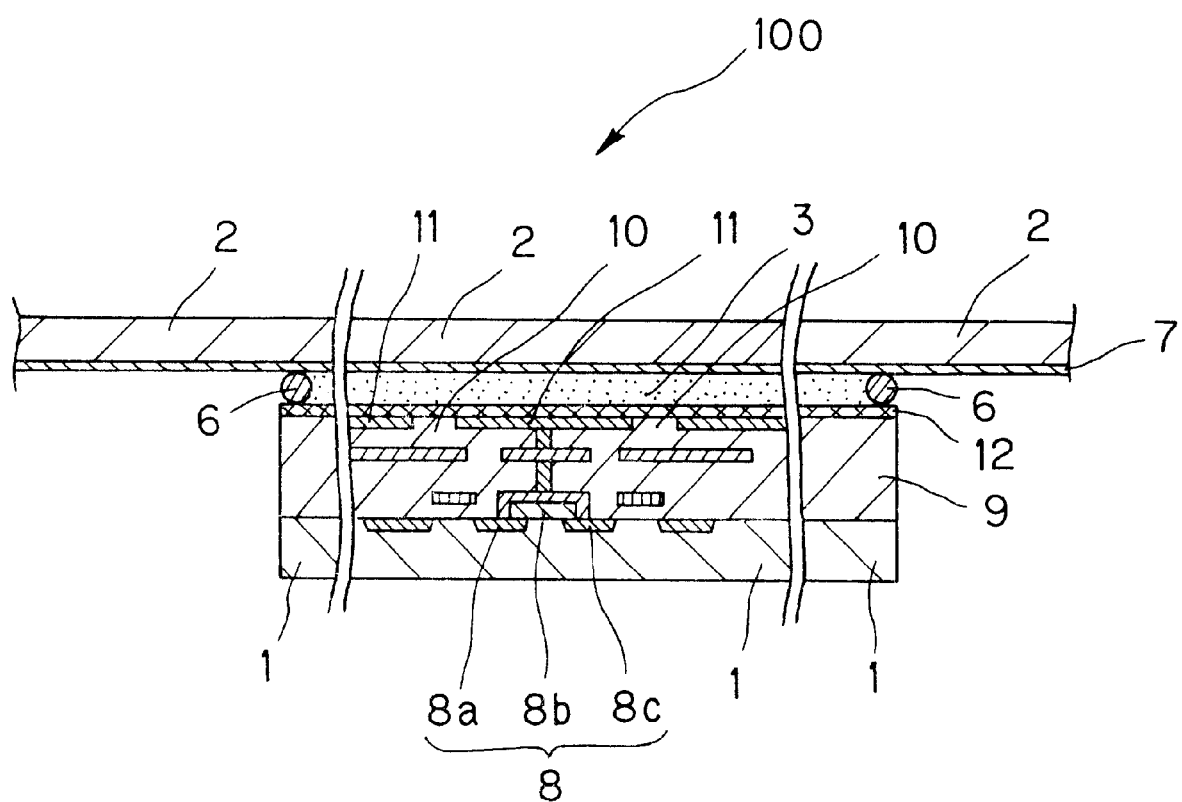
FIG. 2 is a magnified partial sectional view of an LCD panel in the LCD device of FIG. 1C.

FIG. 2 is a magnified partial sectional view showing a detailed structure of the above explained LCD panel 100. As shown in FIG. 2, on the silicon substrate 1, there are provided: a plurality of MOS FETs (as switching elements) 8, each of which includes a source 8a, a gate 8b and a drain c, and which are arranged in a matrix manner on a surface of the silicon substrate 1; an insulation layer 9 for covering each of the MOS FETs 8; and a plurality of pixel electrodes 11 formed of aluminum for example. The pixel electrodes are arranged on the insulation layer 9 in a matrix manner though a plurality of insulation gaps 10 formed of a surface portion of the insulation layer 9.

Further, on the pixel electrodes 11, there are sequentially laminated: a dielectric mirror layer 12 for reflecting an incident light; and an alignment film not shown in the figure, which is obliquely vapor-deposited and is formed of silicon oxide for example. The dielectric mirror layer 12 may be composed of a multiple layered film laminated by alternatively EB (Electron Beam) vapor depositing $TiO_2$ and $SiO_2$, and is formed in the porous manner. The alignment film on the dielectric mirror layer 12 is also formed in the porous manner.

Each of the pixel electrodes 11 is electrically connected through respective one of the MOS FETs 8 to respective one of a plurality of terminals 14 formed on the silicon substrate 1 shown in FIGS. 1A and 1B. Each of the terminals 14 is also electrically connected through bonding wires 15 to respective one of a plurality of terminals 16, which are formed in correspondence with the terminals 14 respectively on the fixture substrate 4.

Since the LCD panel 100 has the above described structure, it can be produced by means of a general silicon process for CMOS production and a general LCD panel production process.

In the above explained construction of the LCD panel 100, the dielectric mirror layer 12 is employed to reflect the incident light from the glass substrate 2 through the liquid crystal 3. However, the dielectric mirror layer 12 may be omitted, while the pixel electrodes 11 are formed of Al (Aluminum), Al alloy or the like so as to play a role of the reflection film in place of the dielectric mirror layer 12 (i.e., a role to reflect the incident light from the glass substrate 2 through the liquid crystal 3).

Figure 3:
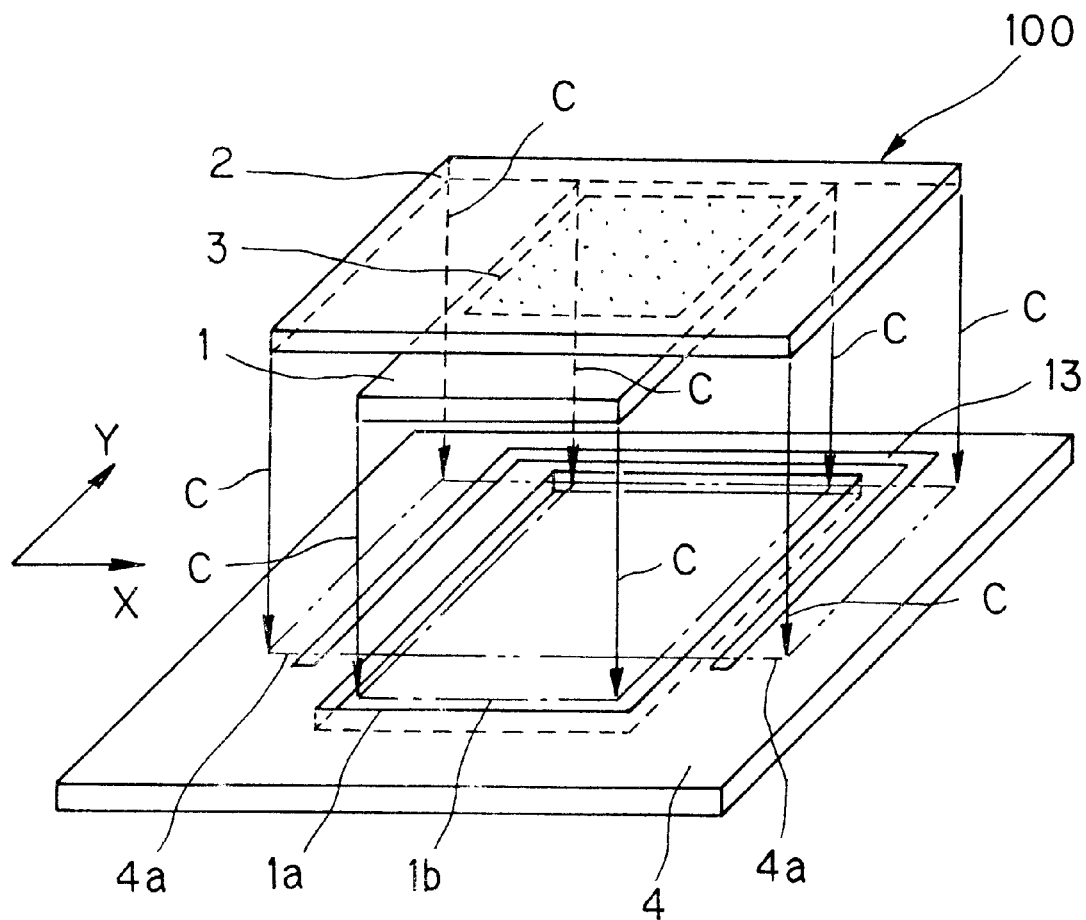
FIG. 3 is a perspective view showing an aspect of the LCD panel of FIG. 2 installed to a fixture substrate.

FIG. 3 shows an aspect of the above explained LCD panel 100 mounted to the fixture substrate 4. As shown in FIG. 3, the fixture substrate 4 has an aperture portion la, at which an aperture is formed in a shape along the outline shape of the silicon substrate 1. The aperture is slightly larger than the outline shape of the silicon substrate 1. The aperture portion 1a is formed such that the width of the aperture is narrower than the width of the glass substrate 2 in a first direction (i.e., the X direction in FIG. 3) of the glass substrate 2 opposed to the silicon substrate 1.

Therefore, in case that the LCD panel 100 having the silicon substrate 1 and the glass substrate 2 is mounted to the fixture substrate 4 along arrows C in FIG. 3, the silicon substrate 1 is disposed at an area 1b in the aperture portion 1a (i.e., a portion within a chain single dashed line in FIG. 3), and both of the edge portions in the X direction of the glass substrate 2 are respectively disposed in areas 4a on the fixture substrate 4 (i.e., a portion of the fixture substrate 4 within a chain double-dashed line in FIG. 3).

The terminal 13 is, as shown in FIG. 3, formed continuously on one portion (i.e. a portion shaped in a "U" character) of the peripheral of the aperture portion 1a on the fixture substrate 4, such that this one portion is partially disposed within the area 4a on the fixture substrate 4 at positions corresponding to both of the edge portions in the X direction of the glass substrate 2.

By this, the adhesive agent 5 not shown in FIG. 3 coated in advance on the areas, which correspond to the edge portions in the X direction of the glass substrate 2, of the fixture substrate 4 is sandwiched by the portions in the area 4a of the fixture substrate 4 and the edge portions in the X direction of the glass substrate 2. Then, by hardening the adhesive agent 5 by irradiating an ultra-violet light from the above side of the glass substrate 4, the edge portions in the X direction of the glass substrate 2 and the corresponding portions of the fixture substrate 4 are adhered to each other, as shown in FIGS. 1A to 1C.

Incidentally, at the time of hardening the adhesive agent 5, the stresses, such as a heat stress due to the heat to promote hardening of the adhesive agent 5, a shrinkage stress due to hardening of the adhesive agent 5 and the like, are applied to portions of the fixture substrate 4 and the glass substrate 2 where the adhesive agent 5 is coated. However, the silicon substrate 1 is disposed in the area 1b within the aperture portion 1a for the silicon substrate 1 such that the silicon substrate 1 is separated acid slightly spaced from these portions where the above mentioned stresses are applied. Thus, the above mentioned stresses are riot applied to the silicon substrate 1.

The glass substrate 2, which is adhered on the fixture substrate 4 by the adhesive agent 5, preferably has a relatively large heat capacity and a relatively high flexibility. The portions at each of which the adhesive agent 5 is coated, are separated and spaced from the central portion thereof which seals the liquid crystal 3. Thus, even if the above mentioned stresses are applied, the central portion of the glass substrate 2 which seals the liquid crystal 3 does not suffer from any harmful influence. Therefore, the LCD panel 100 can maintain its original property before it is mounted to the fixture substrate 4.

The terminal 13 is formed such that two end portions thereof are disposed within the area 4a. Thus, the terminal 13 is fixed at these two end portions on the glass substrate 2 together with the adhesive agent 5 having the electrically conductive property, and is electrically connected in stable with the transparent electrode 7 (not shown in FIG. 3) formed on the glass substrate 2. Therefore, after mounting the LCD panel 100 to the fixture substrate 4, it is not necessary to apply any process for connecting the terminal 13 with the transparent electrode 7. In this manner, the formation as well as the connection of the terminal 13 can be rather easily performed.

As explained above in detail, the aforementioned edge portions in the first direction (i.e., the X direction in FIG. 3) of the glass substrate 2 of the LCD panel 100 are adhered to the fixture substrate 4 together with the transparent electrode 7 on the glass substrate 2, so that the edge portions can be fixed by the adhesive agent 5, and that the terminal 13 and the transparent electrode 7 can be electrically connected with each other in stable. Further, in this condition, since each of the terminals 14 formed on the silicon substrate 1 is disposed at a substantially same level as each of the terminals 16 formed in correspondence with the respective one of the terminals 14 on the fixture substrate 4, it is possible to connect the terminals 14 and 16 with each other easily by the bonding wires 15 by means of a known wire bonding method.

Figure 4:
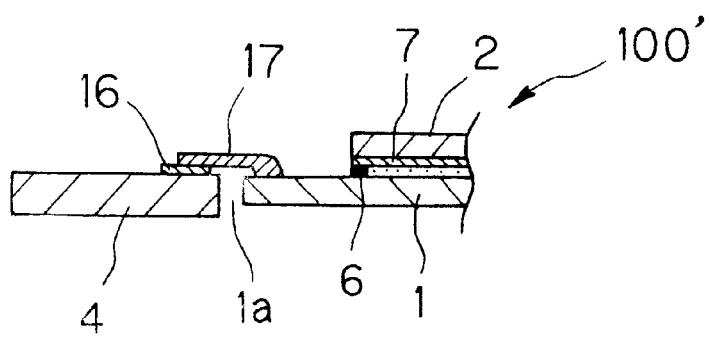
FIG. 4 is a partial sectional view of an LCD device of reflection type as a modified embodiment of the present invention.

FIG. 4 shows a modified embodiment of the LCD display device of the present invention. FIG. 4 is a partial sectional view from a same view point as FIG. 1B. In FIG. 4, the same constitutional elements as those in FIG. 1B carry the same reference numerals and the explanations thereof are omitted.

In FIG. 4, a LCD panel 100' is provided with beam leads 17 formed on the semiconductor substrate 1 in place of the terminals 14 and the bonding wires 15 in FIG. 1B. The beam leads 17 may comprise Au (gold), for example, and are bonded at the leads thereof to the terminals 16 respectively, which may also comprise Au, by Au—Au thermocompression bonding method for example.

According to this modified embodiment, since each of the beam leads 17 formed on the silicon substrate 1 is disposed at a substantially same level as each of the terminals 16 formed in correspondence with the respective one of the beam leads 17 on the fixture substrate 4, it is possible to connect the beam leads 17 and the terminals 16 with each other easily by means of a known beam lead method.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A liquid crystal display device of reflection type comprising a liquid crystal display panel of reflection type and a fixture substrate for fixing said liquid crystal display panel thereto, said liquid crystal display panel comprising:
    a semiconductor substrate;
    a transparent substrate opposed to said semiconductor substrate and on which a transparent electrode is formed at a side opposing to said semiconductor substrate, said transparent substrate having a width in a first direction along a surface thereof wider than said semiconductor substrate;
    a liquid crystal layer sealed between said semiconductor substrate and said transparent substrate;
    a plurality of switching elements formed on said semiconductor substrate at a side opposing to said transparent substrate in a matrix manner in correspondence with a pixel arrangement; and
    a plurality of pixel electrodes formed in the matrix manner in correspondence with the pixel arrangement each connected to respective one of said switching elements,
    said fixture substrate comprising an aperture portion to which an aperture, whose area is larger than an outline of said semiconductor substrate and whose width in said first direction is narrower than said transparent substrate, is formed, said semiconductor substrate being disposed within said aperture, both of edge portions in said first direction of said transparent substrate being adhered on said fixture substrate at a periphery of said aperture by an adhesive agent.

2. A liquid crystal display device according to claim 1, wherein
    a first terminal is formed on said fixture substrate at the periphery, at least in said first direction, of said aperture,
    said adhesive agent has an electrically conductive property, and
    said transparent electrode is electrically connected at the edge portions in said first direction of said transparent substrate with said first terminal by said adhesive agent.

3. A liquid crystal display device according to claim 2, wherein
    said adhesive agent comprises an adhesive agent of ultraviolet light hardening type having the electrically conductive property.

4. A liquid crystal display device according to claim 2, wherein
    a plurality of second terminals, which are respectively connected to said switching elements, are formed on said semiconductor substrate at an edge portion thereof in a second direction, which is perpendicular to said first direction,
    a plurality of third terminals are formed on said fixture substrate such that said third terminals are respectively opposed to said second terminals,
    a surface of said edge portion of said semiconductor substrate, where said second terminals are formed, and a surface of said fixture substrate, where said third terminals are formed, are disposed at a substantially same level, with respect to a direction perpendicular to the surface of said fixture substrate, to each other, and
    said second terminals and said third terminals are respectively connected by conductors.

5. A liquid crystal display device according to claim 4, wherein each of said conductors comprises a bonding wire bonded to respective one of said second terminals at one end thereof and to respective one of said third terminals at the other end thereof.

6. A liquid crystal display device according to claim 4, wherein each of said conductors comprises a beam lead formed on respective one of said second terminals and bonded to respective one of said third terminals at a lead portion thereof.

7. A liquid crystal display device according to claim 2, wherein
    said first terminal is shaped in a U character on said fixture substrate positioned around said aperture, and
    both of end portions of said first terminal are connected to said transparent electrode by said adhesive agent.

8. A liquid crystal display device according to claim 1, wherein said switching elements respectively comprise MOS FETs formed on said semiconductor substrate, which are insulated from each other by an insulation layer formed on said semiconductor substrate, and
    said pixel electrodes are electrically insulated from each other by a gap filled with said insulation layer.

9. A liquid crystal display device according to claim 1, further comprising a dielectric layer formed on said semiconductor substrate at the side opposing to said transparent substrate for reflecting an incident light from said transparent substrate through said liquid crystal layer.

10. A liquid crystal display device according to claim 1, wherein each of said pixel electrodes comprises aluminum having a role of a reflection layer for reflecting an incident light from said transparent substrate through said liquid crystal layer.

* * * * *